June 30, 1959  C. H. LAPSLEY  2,892,476
POWER TOOL APPARATUS
Filed June 27, 1956  6 Sheets-Sheet 1

INVENTOR
Charles H. Lapsley
BY
Frank H. Borden
ATTORNEY

June 30, 1959  C. H. LAPSLEY  2,892,476
POWER TOOL APPARATUS
Filed June 27, 1956  6 Sheets-Sheet 2

INVENTOR
Charles H. Lapsley
BY
Frank H. Borden
ATTORNEY

June 30, 1959  C. H. LAPSLEY  2,892,476
POWER TOOL APPARATUS
Filed June 27, 1956  6 Sheets-Sheet 3

INVENTOR.
Charles H. Lapsley
BY Frank H. Borden
ATTORNEY

June 30, 1959 C. H. LAPSLEY 2,892,476
POWER TOOL APPARATUS

Filed June 27, 1956 6 Sheets-Sheet 5

INVENTOR
Charles H. Lapsley.
BY
Frank H. Borden
ATTORNEY.

June 30, 1959  C. H. LAPSLEY  2,892,476
POWER TOOL APPARATUS

Filed June 27, 1956  6 Sheets-Sheet 6

INVENTOR
Charles H. Lapsley
BY
Frank H. Borden
ATTORNEY.

United States Patent Office

2,892,476
Patented June 30, 1959

2,892,476

POWER TOOL APPARATUS

Charles H. Lapsley, Philadelphia, Pa.

Application June 27, 1956, Serial No. 594,327

12 Claims. (Cl. 144—1)

This invention relates to power tool apparatus and constitutes a continuation-in-part of application S.N. 479,066, filed December 31, 1954, which latter is a continuation-in-part of application S.N. 257,776, filed November 23, 1951, and now abandoned.

It is among the objects of the invention: to improve upon the invention shown in said application S.N. 479,066, while attaining all of the major objectives thereof; to provide a power tool apparatus having a work table comprised of panels of which one is of a series of similarly dimensioned panels which selectively may be planar and substantially coextensive with the table top or alternatively may mount tool devices projecting above and below the work tables top for operation by a power spindle disposed below the table top; to improve lathe organizations for power tools whereby large sizes of work can be turned; to improve the tail stock organization of power tools including a lathe or a drill; to provide a power tool apparatus with extensible table means which can be controlled, adjusted and locked from one side of the table; to improve the details of power tool apparatus for greater efficiency and with enhanced rigidity; to improve the safety of power tool apparatus; to provide in power tool apparatus a lathe organization with a built-in adjustable tool rest; to provide a power tool apparatus with a work table top made of three sections in mutual interfitting relation, of which the center section is one of a series respectively accommodating various different tools, arranged for assembly and disassembly without the use of hand tools; to provide in a power tool apparatus a lathe tail stock pivoted on a support so that selectively it can be vertically disposed for use as a lathe or for drilling or horizontally disposed to form part of the table top of such apparatus; to provide in power tool apparatus a rip fence guide element selectively movable between a position generally normal to the table top and one in which it is substantially coextensive therewith; to provide in power tools tail stock means and means for moving same under controlled force relative to the support for power tools; to provide in power tools adjustable stop means for predeterminedly limiting the movement of a movable tail stock element relative to a support; and other objects and advantages of the invention will become more apparent as the description proceeds.

In the accompanying drawings, forming part of this description.

The invention herein is a refinement of and an improvement on the invention of which this is a continuation-in-part, and preferably utilizes the basic power tool organization of that application. However, as will become evident a number of features of the present invention are susceptible to use with various other types of power tool apparatus and such use is contemplated.

A generally rectangular main support 10 is provided, which may comprise legs or the like in a skeleton type of support, but which is preferably comprised of side panels 11—11, rear panel 12, and vertically short front panel 13, suitably connected to form a supporting framework. The table 19 in major part is supported on the upper edges of side panels 11—11 and rear panel 12, and will be described in detail later herein.

According to the invention of said application, and for illustrative purposes herein, the power tool apparatus comprises a flanged plate 15 mounted on the support 10 for pivotal motion in one plane by any suitable means such as by pivot pins or the like 16 engaging the flanges of the plate with the side panels 11—11 respectively, as an illustrative embodiment. In facilitation of a full 90° swing of the plate 15 it is preferred that the effective axis 16 be substantially coincident with the forward edge of the rear portion of the top, to be described. As shown in said application 479,066 the plate 15 mounts shoes or gudgeons or the like riding in arcuate guide slots in, or by devices mounted on, the respective side panels 11—11. For controlled swinging of plate 15 between positions at which it is generally vertical and normal to the table top 19, and that at which it is generally horizontal and parallel to the table top, or to intermediate positions, a quadrant or sector gear 17, for instance, is coupled to the plate 15 and is in constant mesh with a worm gear 18, mounted on worm shaft 18', and controlled from the rear of the apparatus by external manual crank 18".

Figure 7:
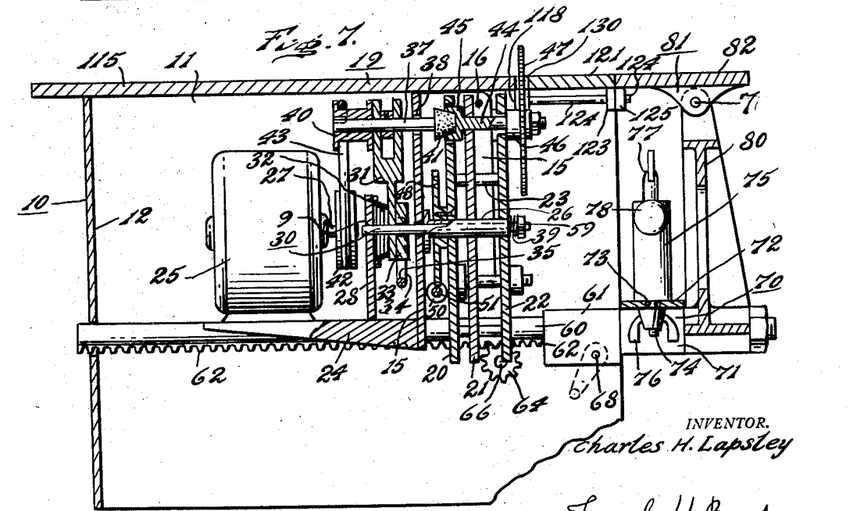
Fig. 7 represents a partially fragmentary longitudinal vertical section through the apparatus.

A turret plate tool mounting organization is disposed for controlled rotation on an axis normal to the plate 15, and, as shown in Fig. 7, illustratively comprises three parallel spaced plates, 20, 21 and 22, held rigidly together in a rigid unitary member by connecting pins and spacers 23. The turret plate is mounted on tubular shaft 26, journalled for rotation on plate 15, and the axis of rotation in shaft 26 is normal to plate 15. On the turret plate thus formed the respective tool spindles, to be described, are journalled, with their respective axes parallel to the axis of tubular shaft 26. Before discussing the tool spindles, reference may be made to the remainder of the plate 15 organization.

A motor-mount platform 24 extends rearwardly from plate 15, on which is mounted motor 25 as a power source, and the axis of the motor shaft 27 is coaxial with that of tubular shaft 26. A rigid stationary bracket 28 is mounted on the platform 24 and has an aperture 9 in line with the motor shaft 27. An oscillatible axially slidable bracket shaft 30 is journalled in the aperture 9 and in the tubular shaft 26 (passing through plate 15), and if desired may extend forwardly beyond shaft 26 and mount a compression spring 39, compressed between a terminal projection 59 on shaft 30 and the face of the turret plate component 22, to assist in biasing the shaft 30 forwardly. A radially extending bracket arm 31 is secured rigidly to the shaft 30 for oscillation therewith as well as for motion therewith axially of the shaft. The shaft 30 and bracket arm 31 are biased toward plate 15, forwardly of the apparatus, either by the spring 39, alone, or by a compression spring 32 surrounding the shaft 30 and engaged between the bracket arm 31 and the bracket 28, alone, or by a combination of the two springs. A clutch throw-out member 33 loosely surrounds shaft 30 in adjacency to bracket arm 31, and is adjustable axially of shaft 30 by the clevis composed of the arms 34 in spaced alignment on and extending radially of oscillatory shaft 35, with the free ends of said arms pivotally engaging the member 33. Shaft 35 projects laterally and extends through arcuate slot 36 in a side panel 11 generated about the effective axis of plate 15. Shaft 35 mounts the external crank or handle 49 by which the shaft 35 can be manually oscillated in all positions of plate 15 on its effective axis.

The bracket arm 31, toward its free outer end journals an axially immovable power drive shaft 37 having a forward portion extending through an arcuate slot 38 in plate 15, generated about the axis of tubular shaft 26. At its rear or inner end drive shaft 37 is keyed to a wide-faced pulley 40. At its forward or outer end drive shaft 37 mounts a clutch member 41. Illustratively the latter comprises a male cone clutch member. A pulley 42 is mounted on motor shaft 27, and a driving belt 43, as an illustrative transmission means, passes over the pulleys 40 and 42. This motor and transmission assembly is purely illustrative, and any other organization may be used to effect torque on the drive shaft 37, while permitting bodily translation of the driven shaft 37 in the arcuate slot 38. The pivoted bracket assembly of said application S.N. 479,066 may be used if desired.

The rotatable turret plate journals a plurality of tool spindles, each comprising a driven member having a removable or adjustable clamping or attaching element to attach and detach a given tool. There are, illustratively, three of such spindles on the turret plate, of which one, as shown in Fig. 7, may be considered as illustrative. Referring to this figure, spindle 44 comprises a shaft journalled in plates 21 and 22 of the turret plate, on its inner end mounting a clutch element 45, complemental to clutch member 41, such as a female cone clutch member, and on its outer end shaft 44 incorporates a tool mounting and dismounting assembly 46. While any desired number of tool spindles 44 may be journalled in even spacing about the turret plate, it is preferred that there be three thereof, of 120° mutual spacing between centers, as this permits each spindle 44 to pass close to the table beneath the top 19, in its translational movement with the turret plate, while it also insures that any given tool, such as the illustrative saw 47, mounted on the illustrative spindle 44, may move bodily arcuately from below the table top 19, transversely across same with its periphery describing a segment of an arc above the table top 19, to movement below said table top, before any given tool on the next adjacent spindle 44 moves upwardly out of the plane of the table top.

To provide such arcuate motion of a given tool, and basically of any tool spindle, the turret plate is keyed to a worm wheel 48, in constant mesh with worm gear 50, on a shaft 51, suitably journalled on plate 15, and extended through arcuate slot 36 in the said side panel 11, and controlled by the manual crank 52, mounted on said shaft externally of said side panel 11.

With the parts as so far described, it will be understood that the bias either from spring 32, or 39, or both, urges the arm 31 and the drive shaft 37 toward the turret plate organization so that whenever the male clutch member 41 on shaft 37 is substantially aligned with female clutch member 45, the bias forces the male member into clutching engagement and torque is transmitted to the instant tool spindle 44, and this is maintained whether the engaged tool spindle is bodily stationary or is in bodily arcuate motion. When it is desired to disconnect the coupling of the drive shaft 37 and the instant tool spindle 44, as for instance, for changing the drive from one tool spindle to another, the shaft 35 is oscillated in the proper sense by crank 49 to force clutch-throw-out member 33 rearwardly. This bears against bracket arm 31, against the bias of the recited spring or springs, and forces bracket arm 31 and shaft 37 to the rear, disengaging the complemental clutch members, and permitting rotation of the turret plate with all tool spindles disengaged from the drive. Release of the crank permits the bias to force the members forwardly to establish clutch-interengagement between members 41 and 45, whenever with rotation of the turret plate a selected tool spindle becomes aligned with the drive shaft 37. If desired the clutch may be temporarily locked-out by suitable detent means associated with the clutch shaft 35 and operative whenever the clutch is manually disengaged.

It is an important feature of the invention of said application that with the drive shaft 37 in coupled or clutching engagement with any given tool spindle, the turret plate mounting the respective tool spindles can be moved angularly about the axis of shaft 26, in any angular setting of the plate 15, with maintenance of the driving relation, as the drive shaft 37 and the instant coupled tool spindle have limited conjoint arcuate motion.

Figure 8:
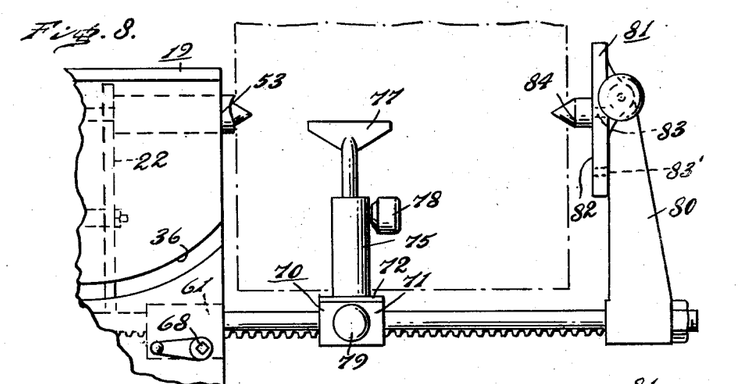
Fig. 8 represents a fragmentary side elevation of the front of the apparatus in extension for use as a lathe or for drilling, with work indicated in dash and dot outline.

It is also an important feature of the invention that any given or designated tool spindle can mount or establish driving relation to any sort of driven tool. For instance, instead of the illustrative saw 47 on a given spindle, the latter may mount a drill or a lathe spindle 53, as shown in Fig. 8, or it may comprise a power take-off spindle for driving interconnection with pulley 134 of Fig. 10, to be described. For these latter uses the tool spindle may be located and held at the top of its arc of movement, when the largest piece of work is to be disposed in the lathe, or for possibly smaller pieces of work, or for other tools or for other reasons, it may be angularly displaced downwardly therefrom, within the limits of conjoint arcuate movement of the coupled drive shaft and tool spindle, as disclosed in Fig. 9. When it is desired to lock the turret plate in a given angular position, in augmentation of the resistance to undesired turning effected by the worm gear 50, as for instance during operation as a lathe, a brake shoe 54 is forced against one of the plates 20, 21 or 22, and as shown, it engages plate 21, by threaded shaft 55 threaded through a lug 56 on plate 15, and disposed in the arcuate slot 36 and controlled by a knob 57.

For supporting the tail stock, to be described, horizontal rods 58 and 60 are provided, slidably guided and supported in split lugs 61 on the respective side panels 11—11, for axial motion parallel to the table top 19 in forward extension and rearward retraction. In one form of the rods, they each have a series of teeth 62 on one surface thereof. Illustratively the teeth are on the lower surfaces, and the rods are constituted as racks. The racks are respectively in permanent mesh with pinion gears 63 and 64. Although the rods 58 and 60 are preferably disposed well below the center of the support, in order to establish large capacity for the lathe, to be described, it will be evident that owing to the swing of the plate 15 and the elements mounted thereon a straight shaft mounting the gears 63 and 64 would present an obstruction precluding such swinging, and operation from one side only would be impossible. While through any system of gearing and shafting one sided operation without interference with the swing of the plate can be achieved, this is expensive and introduces lash militating against exact synchronism of extension and retraction. In view of the preferred tail stock and support organization, to be described, it should suffice in illustration of the invention according to this present form, the respective gears 63 and 64 are mounted on short stub shafts 65 and 66 journalled in the respective side panels 11—11. Each stub shaft mounts a manual crank 67. In order to hold the rack rods where set in their positioning by the gears, or either of them, the respective split lugs 61 are apertured and are each provided with manually operated threaded members 68 for compressing and relaxing the split in the lug.

A tool rest base 70 is provided comprising, illustratively, a pair of parallel spaced sleeves 71, connected by a slotted cross member 72, in the slot 73 of which the vertical pin 74 of the tool rest post 75 is disposed. The sleeves are slidably mounted on the respective rods, and preferably at least one bears visible graduations of length divisions by which the sleeves can be accurately located on the rods for a purpose to be described. The tool rest post 75 is slidable transversely of the apparatus in the slot 73 and is anchored in a desired transverse setting by the wing nut 76. The tubular post 75 mounts the actual tool rest 77, arranged for vertical and angular adjustments and is anchored in a desired position by a setscrew 78. The sleeves 71 are provided with set-screws or the like 79, for bearing against the respective rods to anchor the sleeves and thus the tool rest in a desired position on rods 58 and 60. The sleeves 71 are of carefully predetermined axial length so as to extend forwardly from abutment against the front faces of the split lugs 61 not more than the predetermined distance, so as to permit the tail stock, to be described, to form part of the table top 19 as an effective continuation thereof without removing the tool rest from the apparatus. See Fig. 7.

Figure 12:
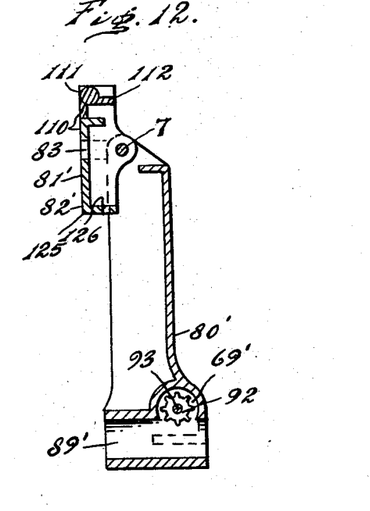
Fig. 12 represents a vertical section through a modified form of tail stock assembly, with the pivoted tail stock in its vertical disposition when used as a lathe or for drilling.
Figure 13:
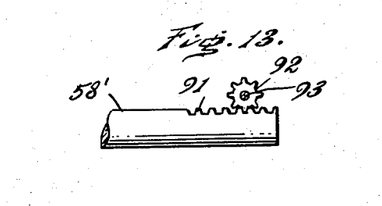
Fig. 13 represents a fragmentary elevation of the supporting rod rack and gear assembly for the tail stock of Fig. 12.
Figure 14:
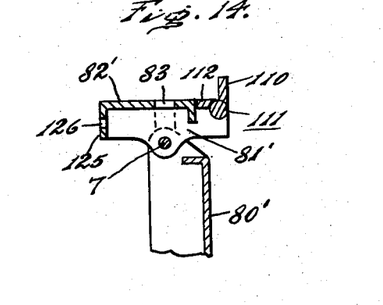
Fig. 14 represents an end elevation, partially in section, of the pivoted tail stock portion in its horizontal disposition.
Figure 15:
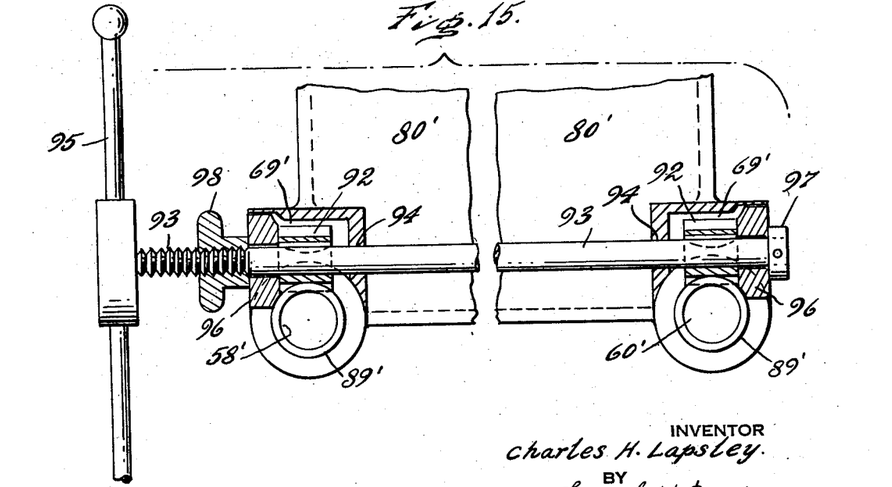
Fig. 15 represents a fragmentary transverse section through the tail stock plate of Fig. 12, showing the locking organization by which an attained rod and tail stock relative position can be locked to both horizontally spaced rods from one side of the apparatus.

In the form of the invention as so far described, the slidable rods 58 and 60 at their respective forward ends rigidly mount the tail stock plate 80, comprising a rigid ribbed transverse member extending across the apparatus between the rods. It will be evident that instead of the rigid connection the adjustable connection of Fig. 12, and related figures, to be described, may be used to advantage.

Figure 9:
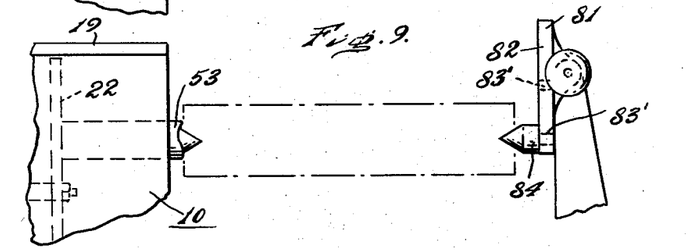
Fig. 9 represents a similar view with the lathe spindles at a lower setting than in Fig. 8, and with work on the spindles and indicated in outline.

On a transverse horizontal axis 7 in the upper end of plate 80, under setting control by a suitable adjustable clamp 8, is the tail stock 81, having two extremes of pivotal adjustment, of which one is with its face 82 in a substantially vertical plane, and the other is with its face in a substantially horizontal plane coextensive with the surface of the table or table top 19. The face 82 is provided with at least one spindle-receiving aperture 83, normal to its face, in order to receive and permit free rotation of a removable lathe spindle 84, complemental to the driven lathe spindle 53. Generally the aperture 83 is so located in the face 82 as to be in axial alignment with the axis of the driven spindle 53 at the top of the rotative translational path of the latter. If it is desired to utilize a lower setting for the complemental lathe spindles, as indicated in Fig. 9, the complemental spindle 84 may be mounted in a secondary aperture 83' in the face 82.

Before discussing the organization of the table top 19, reference may be made to a preferred form of extensible rod and tail stock assembly. In this form of the invention the tail stock is adjustably positioned by what may be designated as coarse adjustments of the rods relative to the apparatus, and as fine adjustments of the tail stock relative to the rods. By this preferred form the actual locking adjustment of the rods is from one side only, while the fine adjustment is also from the same side and has the important advantage of being substantially immune to the disadvantageous effects of saw-dust and the like clogging materials, while effecting a stronger and more rigid organization.

In this form of the invention the horizontal side rods 58' and 60', which may be tubular (as may rods 58 and 60), toward the rear ends are provided with an axially aligned series of lower surface apertures or recess 90, while the extreme forward ends thereof are formed with a plurality of, preferably, upwardly presenting uniformly spaced teeth 91, in constant mesh with pinion gears 92, suitably journalled for controlled rotation in the tail stock plate 80'. In order to combine adjustments with locking in any attained adjustment, the gears 92 are keyed to a transverse shaft 93, and are each of axially greater width than the width of the teeth 91 on side rods 58' and 60', so as to maintain meshing regardless of axial shifting of the respective pinion gears. The gears 92 turn in and project slightly from rounded pockets 69' into rod guiding channels 89' of appreciable length. The shaft mounts a manually operated crank 95. Washers 96—96 slide over the shaft 93 in close adjacency to the respective sides of tail stock plate 80' and are contoured to engage and frictionally interlock with the supporting side rods 58' and 60' when forced. At the outer free end of shaft 93 a nut 97 is mounted. A manually rotatable nut 98 is threaded on a threaded extent of shaft 93. As the gears 92 are in mesh with the short rack lengths of the respective rods 58' and 60" rotation of the manual device 95 rotates the shaft 93, and turns the gears 92 in synchronism to move the tail stock plate 80' axially of the rods, to locate same wherever desired with reference to said rods. It will be observed that in general the entire axial extent of teeth 91 is always substantially enclosed within the guide channels 89' in every adjusted tail stock plate position, so that saw-dust or the like, falling on the tail stock plate and its mounting, cannot clog the teeth 91. In order to lock the tail stock plate in any attained position, the manually actuated nut 98 is turned relative to the threaded positive lock portion of shaft 93, so as simultaneously to force the lock washers 96—96 at the respective shaft ends towards each other and into locking frictional engagement against the respective rods 58' and 60'. This anchors the tail stock plate temporarily in a set position on the rods. This is the fine adjustment of the tail stock plate.

In this form of the invention the coarse adjustment is by adjustments of the rods themselves. This utilizes the lower apertures 90 in the respective rods 58' and 60'. It may also use the rack and pinion organization of the earlier figures, or the like.

Figure 16:
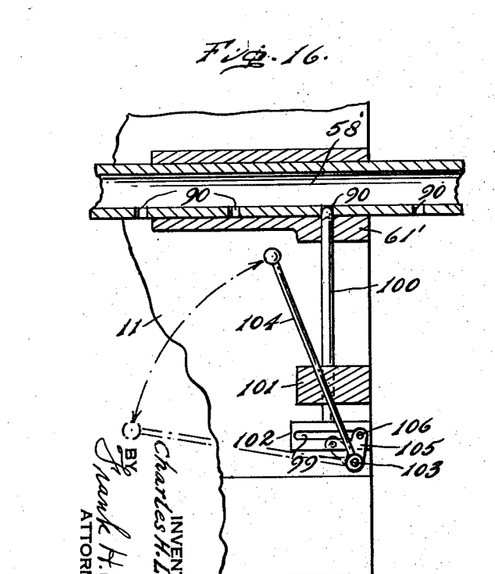
Fig. 16 represents a fragmentary longitudinal section through a slidable rod and its guide for supporting the tail stock showing the locking pin and its control lever, in full lines showing the pin engaged and in dotted lines showing the pin retracted, in a relatively coarse adjustment of the rod.
Figure 17:
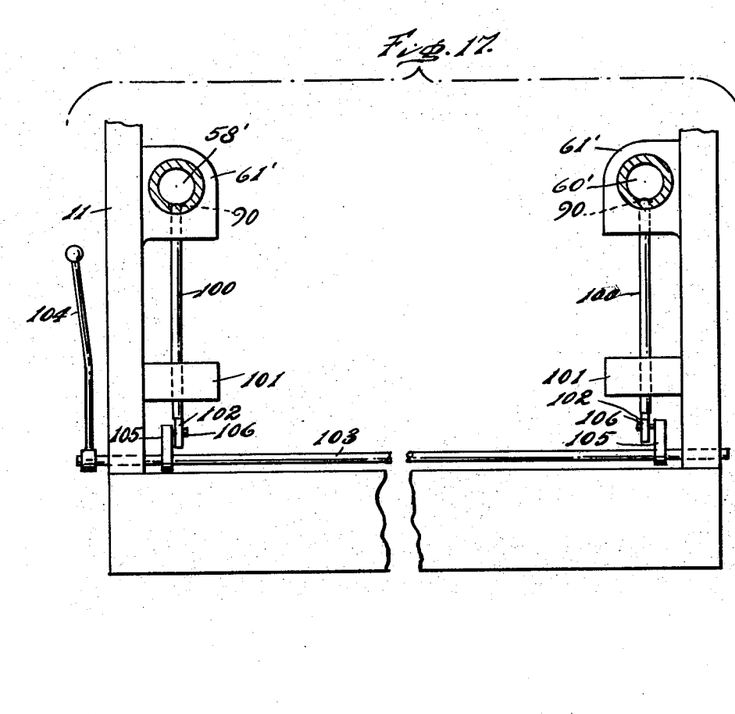
Fig. 17 represents a fragmentary transverse elevation of the support showing the linkage for controlling a pair of locking pins in their relation to a pair of sliding rods, shown in section.

The coarse adjustment, as shown in Figs. 16 and 17, is by means of vertically adjustable pins 100. There is one pin 100 on each of the side panels 11—11, controlled by a single lever on one side of the table or apparatus. Each pin 100 is vertically guided in a lug 101 and in a suitable bore in the rod guide 61'. The lower end of each pin 100 is rigidly affixed to a bearing member 102, having a horizontal slot 99, and lying in a plane parallel to the side panels 11—11. A shaft 103 is journalled in the lower part of the side panels 11 and extends transversely across the support. This is so far down in the organization as to be out of interfering position relative to the swinging of the plate 15 and the parts mounted thereon. Externally of one side panel 11, a generally vertical arm 104 is rigid with the cross shaft 103 for manual actuation thereof in oscillation about the shaft axis. The shaft 103 mounts short lever arms 105, respectively adjacent to the respective bearing members 102, and the free ends of the lever arms mount horizontal pins 106, extending through the slots 99 in the bearing members. Moving the handle arm 104 toward the rear about the axis of shaft 103 moves pins 106 arcuately in the respective slots 99, pulling downwardly on the pins 100 until they have moved far enough for the upper ends of the pins to be clear of the outer surfaces of the horizontal rods 58′ and 60′. With the rods thus released it is an easy matter for the operator to grasp the tail stock organization and pull it out to approximately the distance the tail stock is to be spaced from the turret plate and until the pins 100 align with instant apertures 90. Pursuant to such alignment the handle arm 104 is moved forwardly in a full swing to force the pins vertically into the respective apertures to simultaneously lock both horizontal rods in their attained positions. It is a feature that with the handle swung to its maximum forward adjustment the lever arms 105 are cocked slightly forward so that the horizontal pins 106 are at the extreme forward ends of slots 99, having passed top dead center, so that the weight of the pins is absorbed without any tendency to rotate the shaft 103, and precluding inadvertent release of the pin and aperture lock from vibrations or otherwise.

In this last and preferred embodiment of the invention the tail stock 81′ has its face 82′ partially formed of the outer surface of a first leg 110 of an element 111 having a second leg normal to the first leg. Leg 110, as noted, forms part of the surface 82′, and when the element 111 is swung on its pivot to a secondary stopped position, the leg 110 becomes a rip fence extending vertically from the then horizontally disposed face 82′, while the leg 112 completes the surface 82′.

Reference has been made to the work table or table top 19, as a generic designation thereof. This is preferably composed of a rear table element 115, which if desired may be of such formation as to have limited longitudinal sliding relative to the support, as by depending stops or lugs 116 close to the inner surfaces of the side panels 11—11 for guiding the slidable member or element 115, engageable at the rear against rear panel 12, and engageable at the front against lugs 117 on side panels 11—11. Rear table element 115 rests on the upper edges of side panels 11—11 and rear panel 12 and overhangs said panels. At the forward end the rear table element 115 has a pair of transversely spaced depending lugs 118, having horizontal bores 120. An intermediate or central table portion 121 is provided, which forms, with the horizontally disposed tail stock 81 or 81′, the complete table surface. The table may be considered as formed of a first, second and third element, of which the rear element 115 is the first, the central or intermediate portion 121 is the second, and the tail stock 81 or 81′ is the third.

The second table portion is preferably one of a series of related units, interchangeably associated with the first and third elements.

The central table unit or element 121 is provided with transversely spaced rear depending lugs 122 and front depending lugs 123, in longitudinal alignment with the depending lugs 118 on the front end of the rear table element 115. Dowel pins 124 or the like are mounted to extend longitudinally beyond the respective lugs 122 and 123. The central unit, like rear element 115, overhangs the side panels 11—11 and is slidable on the upper edges thereof so as to guide the rear ends of the dowel pins into the bores 120 in the lugs 118. The third table section, the tail stock 81 or 81′, at its rear edge, in its horizontal positioning, has depending lugs or a flange 125 having horizontal apertures 126, for the reception of the forward ends of the dowel pins 124, to hold the tail stock in its horizontal attitude, in a completion of the table top 19.

Figure 1:
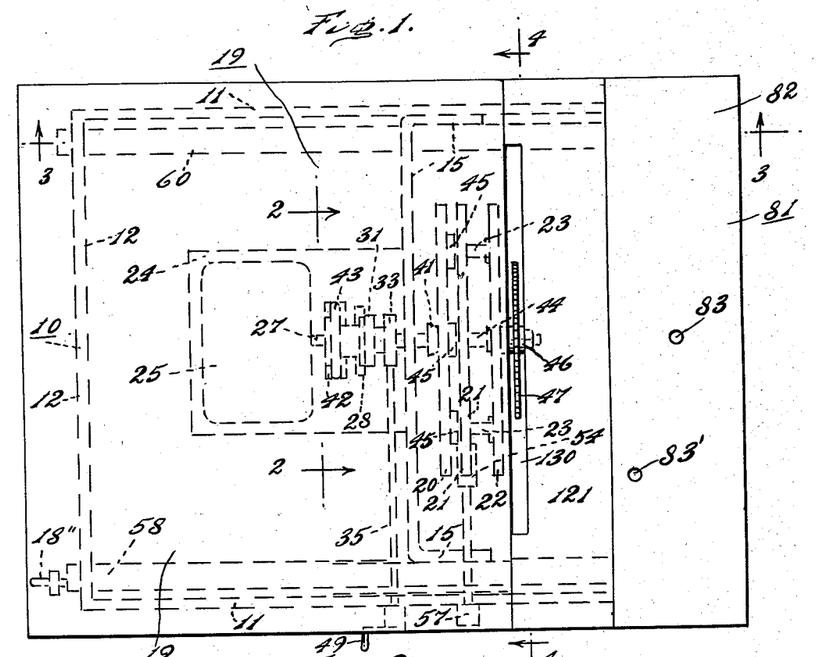
Fig. 1 represents a partially diagrammatic plan of the apparatus according to the invention, with certain parts and tool elements omitted, for clarity.
Figure 2:
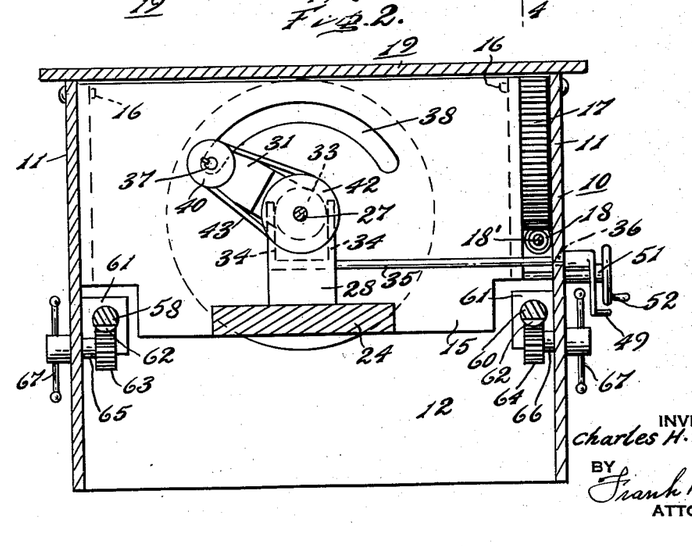
Fig. 2 represents a section on line 2—2 of Fig. 1.
Figure 3:
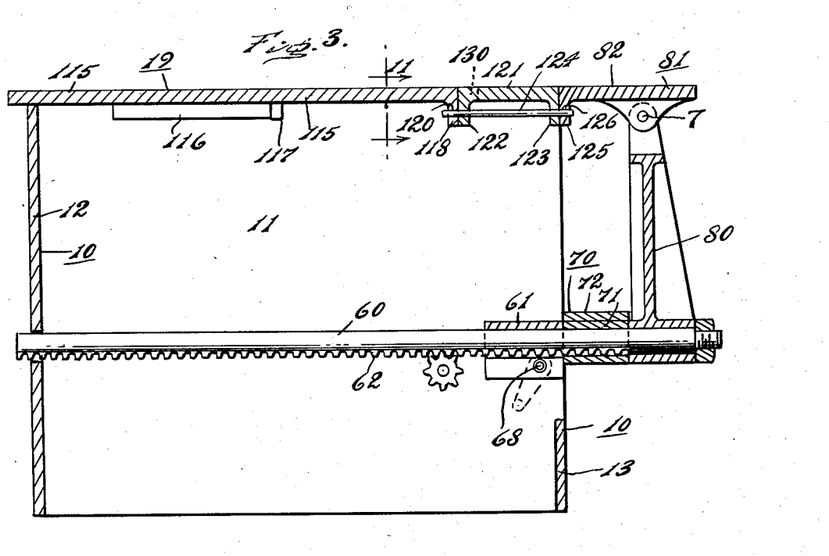
Fig. 3 represents a section on line 3—3 of Fig. 1.
Figure 4:
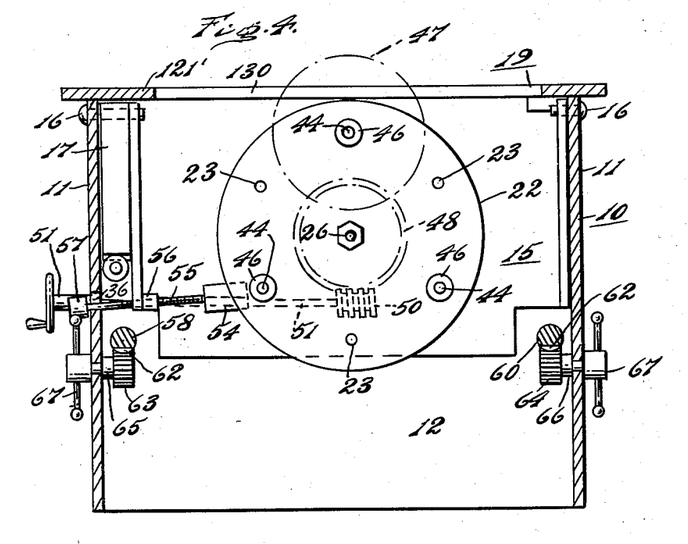
Fig. 4 represents a section on line 4—4 of Fig. 1.
Figure 5:
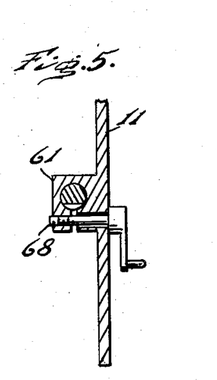
Fig. 5 represents a fragmentary section through an extensible rod guide and lock.
Figure 6:
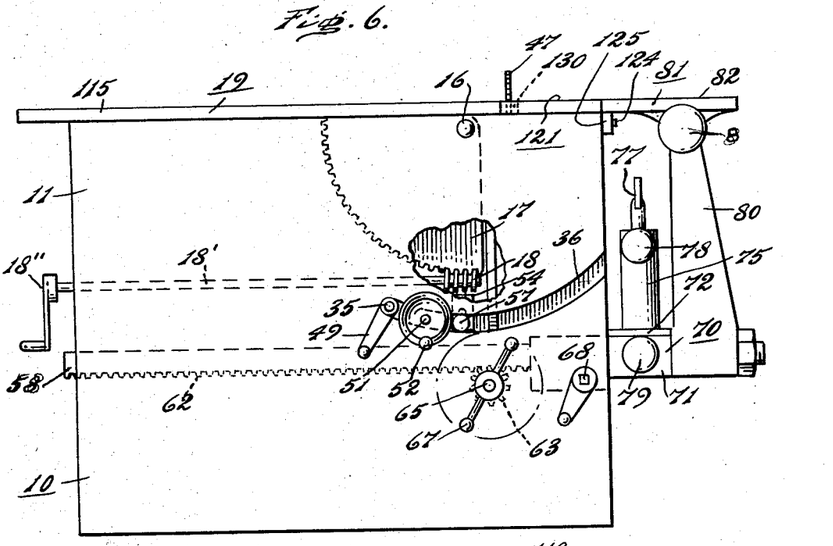
Fig. 6 represents a side elevation of the apparatus, partially broken away.

It will be evident that with various types of tools on or in driven relation to a given tool spindle, there needs to be various sizes and shapes of apertures in the complete table surface 19, to permit extension of such tool above the level of the table for operation of work mounted thereon, or the requirement may be for a flat complete table without apertures. The series of central or second units 121 conduces toward this desirable end. It will be understood that the center section 121 may therefore be provided in a plurality of forms, all of the same effective dimensions in width, so as to fit snugly between the front end of the rear table portion 115 and the rear end of the tail stock 81 or 81′, in its horizontal disposition. As will become evident the center section may also be used to support tools mounted above the table in driven relation to a tool spindle below the table top. In a typical example of one of the series of center sections 121, reference is made to Fig. 1. In this figure, for simplicity and clarity the only tool shown mounted on the turret organization is the saw 47. To accommodate the saw in both its rotation and bodily translation in an arc, the rear edge of the center section 121 is recessed between the overhanging planar edges thereof, to form with the front edge of the rear table section a rectangular slot 130. Other center sections may have other shapes and sizes of recesses according to the nature of the instant tool being used. If it is desired to enlarge the table surface a plurality of center sections may be interfitted together and held in place by the tail stock.

Figures 10, 11:
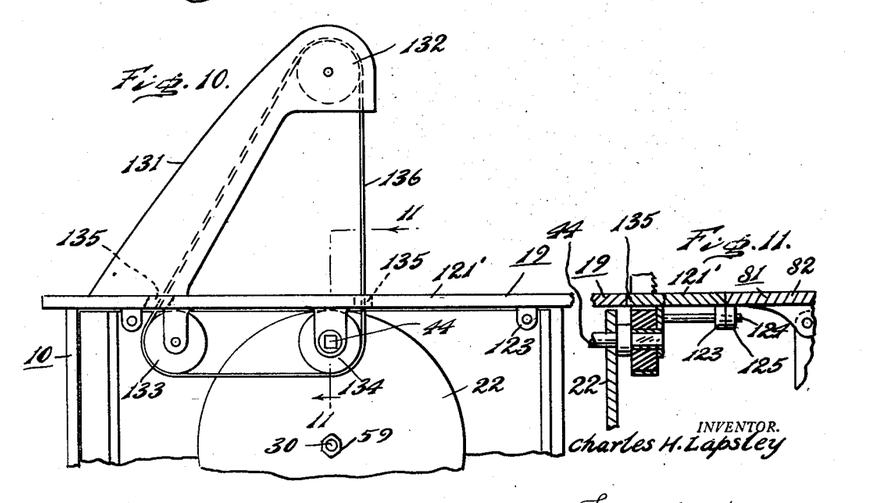
Fig. 10 represents a side elevation of an illustrative center section of the table top mounting a band saw unit for driven coupling to a tool spindle below the table top.
Fig. 11 represents a fragmentary vertical longitudinal section of the apparatus table top including a section of Fig. 10, taken on line 11—11 of Fig. 10.

Referring to Figs. 10 and 11, the center section 121′ mounts a channel section upright 131. A roller 132 is journalled in the upper portion of the upright. An idler roller 133 is journalled beneath the section 121′. A driving roller 134 is journalled beneath the center section 121′ in substantial vertical alignment with the upper roller 132. Driving roller 134 incorporates a clutch element complemental to power take-off spindle 44. For convenience the roller 134 is shown as having a rectangular bore in its axle complemental to a rectangular shaft on the spindle. Any other sort of driving connection can be used which permits the center section to slide rearwardly and synchronously interfit with the rear table top section 115 as the driving spindle engages the driving roller 134. In this case it will be seen that the power take-off spindle is at the top of its arcuate path of bodily motion. Short slots or recesses are cut or formed in the rear edge of section 121′ as at 135—135, by means of which a bandsaw 136 may be mounted on the three rollers and be operative relative to work on the table top. For this purpose roller 132 is journalled on a short axle projecting from one internal face of the channel only. It will be apparent that other tools may be mounted on a center section and actuated from below for operation on work on the table top 19. A drill press for instance may be so mounted. However it is generally preferred to use the tail stock feed relative to the table support to force work against a drill mounted on a tool spindle, as will be clear.

In connection with the last sentence it is a feature of the anchorable tool rest that it can be used as an adjustable positive stop to the movement of the tail stock toward the support when desired. This is accomplished either by limiting the forced inward movement of the movable rods progressing the tail stock by abutment of the tool rest against the rod guides 61, or limiting the direct tail stock movement on and relative to the rods.

This is quite advantageous, as for instance, for predetermining and limiting the depth of a bore formed in work by a drill mounted on a tool spindle.

It may be noted that although the illustrated form of tool rest incorporates a pair of parallel spaced sleeves 71 for respective mounting on rods 58 and 60, this may present resistance to sliding adjustment by reason of the possible binding of the respective sleeves on the respective rods. As, in use as a tool rest, all of the pressures thereon are in one direction toward the rotating work and relative to one rod, it will be seen that two sleeves 71 are not essential and one can be eliminated without disadvantage. In this situation the cross member 72 at one end is rigid with one sleeve 71, while the other end thereof merely rests on or presses against the other rod, and the tool rest slides easily. Further this simplified form permits the tool rest to pivot about the sleeve-engaged rod to dependency therefrom out of adjacency to the tool area, if this should be desired.

Finally it will be noted that the change from the driven relation of one tool to that of another, the controlled positioning of the tail stock and its angular relation to the table top, and the assembly and disassembly of the table top are all effected without the use of a single tool.

I claim as my invention:

1. A tool apparatus comprising table means effecting a horizontal work surface, a support below said work surface, a turret plate mounted for rotation on said support below said work surface, a rotatable tool spindle mounted on the turret plate to move bodily in an arc with rotations of said turret plate, said spindle incorporating driven means for actuating same when energized, power means, a driving member in driven relation to said power means for energizing said spindle, means for rotating said turret plate to position said spindle on its arc of movement, means establishing limited conjoint arcuate movements of said turret plate and said driving member, said table means comprised of plural sections in horizontal alignment comprising a first end section mounted on the support generally above said turret plate, a second end section on said support spaced horizontally from said turret plate, and a portable intermediate section removably mounted on the support between the respective end sections, and means for forcing the end sections relatively toward each other on the support to engage and anchor said intermediate section to establish the horizontal work surface.

2. A tool apparatus as in claim 1, in which said respective sections have downwardly extending apertured lugs in respectively confronting relation to lugs on an adjacent section, and horizontal pins passing through the apertures of said lugs.

3. A tool apparatus as in claim 1, in which said second mentioned section is horizontally pivoted on the support and movable angularly between a position aligned with the horizontal work surface and a position angularly divergent therefrom and in horizontal intersection by said tool spindle in projection for functioning as a lathe tail stock.

4. A tool apparatus as in claim 3, and an adjustable tool rest permanently mounted on the support and of such narrow extent in the direction of relative movement of the first and second sections and being susceptible to movement on the support in such direction as to be locatable directly under said second section when the latter is in its horizontal alignment with the table surface, while being exposed and adjustably operable when said second section is swung on its horizontal pivot in its functioning as a lathe tail stock.

5. A tool apparatus comprising table means effecting a horizontal work surface, a support below said work surface, a turret plate mounted for rotation on said support below said work surface, a rotatable tool spindle mounted on the turret plate to move bodily in an arc with rotations of the turret plate, said spindle incorporating driven means for actuating same when energized, power means, a driving member in driven relation to said power means for energizing said spindle, means for rotating said turret plate to position said spindle on its arc of movement, means establishing limited conjoint arcuate movements of said turret plate and said driving member, said table means comprised of plural sections in horizontal alignment and comprised of a first end section mounted on the support generally above said turret plate and a second end section on said support spaced horizontally from said turret plate, means for moving said sections relatively apart or toward each other, said second end section having a longitudinal surface recess extending transversely of the support, a rip fence permanently pivoted in said recess and including a leg movable out of the recess to a position substantially normal to said second table section and into the recess to form a flush horizontal surface on said second end section.

6. A tool apparatus comprising a fixed housing support including a pair of vertical side plates the upper edges of which lie substantially in a common horizontal plane, a pair of rods, means mounting said rods for horizontal positioning on the respective side plates, means for anchoring said rods to said plates in variable positions of relative adjustment, a table section mounted on said side plates, a turret plate mounted for rotation on said support generally below said table section between said side plates, a rotatable tool spindle mounted on the turret plate to move bodily in an arc with rotations of said turret plate, power means for rotating said spindle, means for rotating said turret plate to position said spindle on its arc of movement, table means mounted on and extending transversely between said rods and adjustably movable therewith toward and away from said table section, and a portable removable intermediate table section mounted on said side plates and engaged between said table section and table means to complete a table surface above said turret plate.

7. A tool apparatus as in claim 6, in which said portable removable intermediate section incorporates passage means and said tool spindle operates a tool projecting through said passage means.

8. A tool apparatus as in claim 7, in which a tool is mounted on said intermediate section and includes means below the said table top for operative connection to said spindle.

9. A tool apparatus as in claim 6, and means for moving said table means relative to said rods for engaging and disengaging said intermediate table section.

10. A tool apparatus as in claim 9, in which said table means is mounted on a horizontal pivot for angular motion between a first position in which it is in alignment with the table section and a second position generally normal thereto in substantial parallelism with said turret plate, and means for mounting a lathe spindle on said table means in intersection of a point on said arc in horizontal projection.

11. A tool apparatus comprising table means effecting a work surface, a support below said work surface, a turret plate mounted for rotation on said support below said work surface, a rotatable tool spindle mounted on said turret plate to move bodily in an arc with rotations of the turret plate, said spindle incorporating driven means for actuating same when energized, power means, a driving member in driven relation to said power means, means operatively associated with said driving member for engaging and disengaging same with the driven means of said tool spindle, means for rotating said turret plate to position said spindle on its arc of movement, means establishing limited conjoint arcuate movements of said turret plate and said driving member, guide means on opposite sides of said support, a pair of rods mounted in said guide means, an end connection joining the outer ends of said rods whereby the effective work surface can be extended by telescopic action of said rods relative to said table means, and rotatable tool means mounted on said connection in horizontal alignment with said tool spindle in one adjusted position of said turret plate whereby work can be engaged between said tool means and said aligned tool spindle for rotation by the latter.

12. A tool apparatus as in claim 11 in which the tool means comprises a lathe spindle, a power lathe spindle mounted on said tool spindle, and means for locking said rods and thus the end connection whereby engaged work can be turned by a manually held tool.

References Cited in the file of this patent

UNITED STATES PATENTS

| | | |
|---|---|---|
| 1,608,037 | Rochon | Nov. 23, 1926 |
| 2,200,799 | Miller | May 14, 1940 |
| 2,226,029 | Taylor | Dec. 24, 1940 |
| 2,517,608 | Taylor | Aug. 8, 1950 |
| 2,623,269 | Goldschmidt | Dec. 30, 1952 |
| 2,733,741 | Lindee | Feb. 7, 1956 |